Feb. 4, 1958

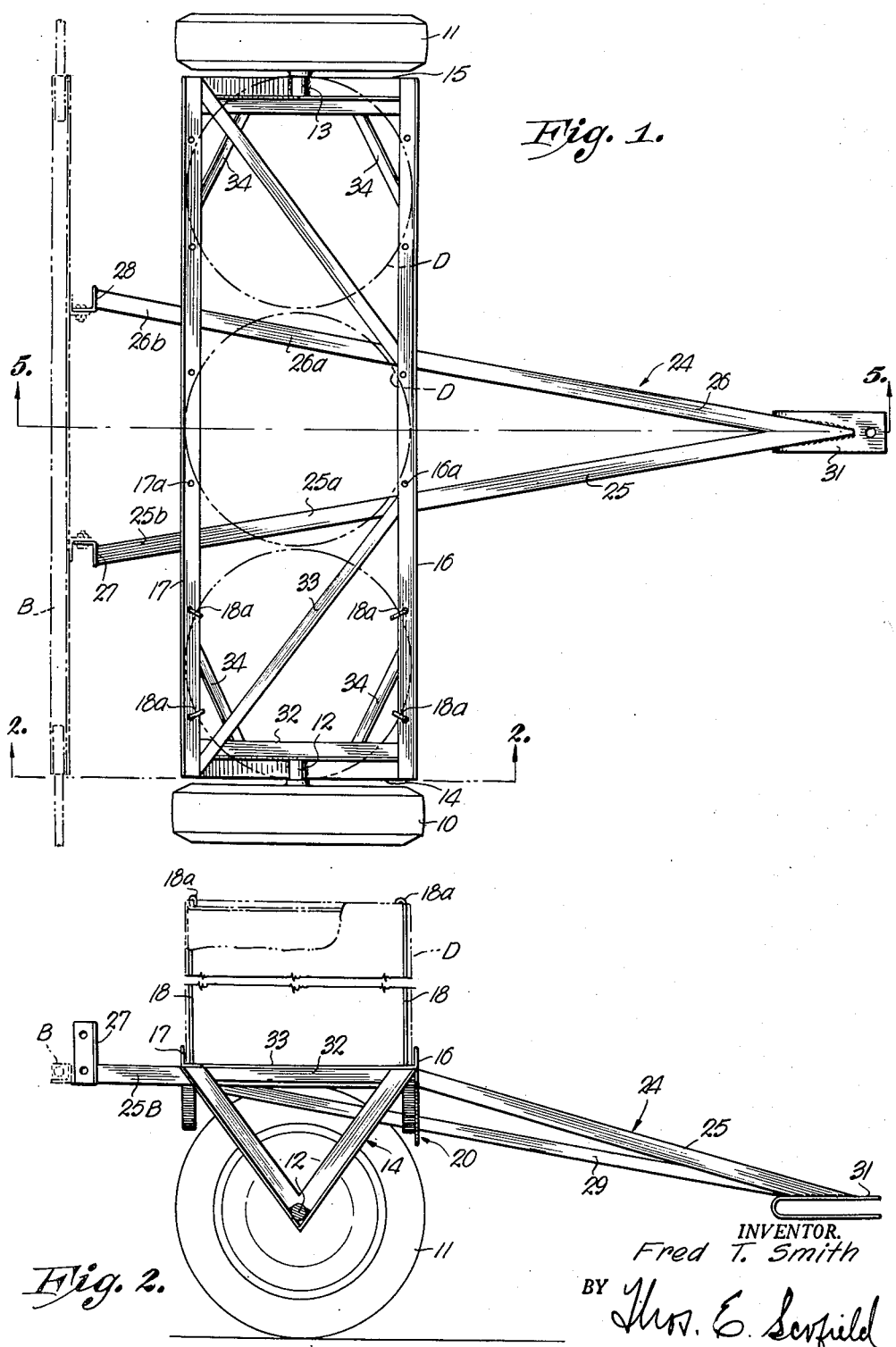

F. T. SMITH 2,822,184

TWO WHEEL SPRAY TRAILERS

Filed June 14, 1956

INVENTOR.
Fred T. Smith
BY
ATTORNEY.

United States Patent Office 2,822,184
Patented Feb. 4, 1958

2,822,184

TWO WHEEL SPRAY TRAILERS

Fred T. Smith, Kansas City, Mo., assignor to Precision Research and Development Company, Kansas City, Mo., a corporation of Missouri Application June 14, 1956, Serial No. 591,503

1 Claim. (Cl. 280—63)

This invention relates to the construction of two wheel trailers adapted to be drawn behind a tractor or like vehicle and refers more particularly to a trailer of this type, especially designed for carrying crop spraying equipment including the drums in which the spraying liquid is contained.

A primary object of the invention is to provide a trailer of the character described in which the trailer is extremely light in weight, yet is capable of supporting a plurality of drums filled with spray liquid during travel over rough and uneven ground without danger of breakage. One of the features of the invention resides in the way in which the trailer is assembled to obtain this result, that is, the relationship established between the structural members making up the trailer frame.

Another object of the invention is to provide a crop spray trailer having a novel draft tongue which forms a third point of support to maintain the top of the trailer frame level and to provide a means of connecting the tongue with the trailer frame to provide optimum strength in the assembly without points of undue stress concentration.

A further object of the invention is to provide a spray trailer of the character described in which the trailer frame is so arranged with respect to the running wheels as to provide adequate clearance between the lowermost points on the trailer frame and the crops which are being sprayed. A trailer constructed according to the invention is especially useful in connection with the spraying of row planted crops, since the wheels can be disposed between rows with the trailer structure spanning the crops at a height which prevents a minimum of damaging contact between the crop and the under parts of the trailer.

Still another object of the invention is to provide a trailer of the character described which is provided with integral brackets for supporting a spray boom at proper level on the unit, the brackets being formed as extensions of the tongue-forming members on the opposite side of the trailer from the tongue structure.

A further object of the invention is to provide a trailer structure of the character described which is constructed with a minimum of parts; which is light in weight; which is simple and economical to manufacture; and which is capable of withstanding long and rugged use.

Other and further objects of the invention with the features of novelty pertinent thereto will appear in the course of the following description.

In the accompanying drawings which form a part of the specification and are to be read in conjunction therewith and in which like reference numerals indicate like parts in the various views:

Fig. 1 is a top plan view of a trailer embodying the features of the invention;

Fig. 2 is a view taken along the line 2—2 of Fig. 1 in the direction of the arrows;

Figure 3:
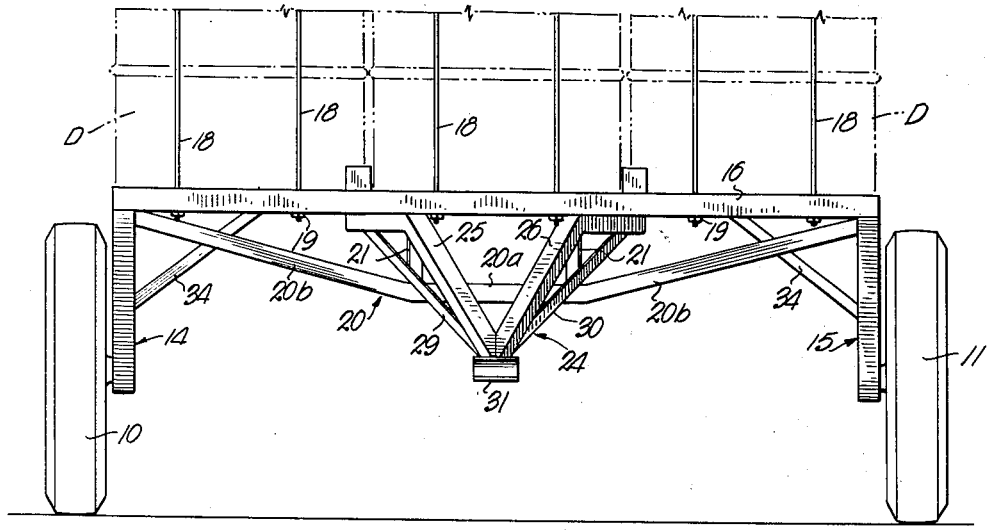
Fig. 3 is a front elevation of the trailer.

Referring to the drawings, in Figs. 1, 2, 3 and 5, the trailer is illustrated in connection with a plurality of spray containing drums D disposed thereon and a portion of a spray boom structure B. Since the boom and drums are conventional, they have been shown in broken lines. It will also be noted that the conventional hose lines, pumps and valves which normally form a part of the spray equipment itself have not been shown, but inasmuch as they play no part in my invention, their presence is not necessary.

The running wheels of the trailer are indicated at 10 and 11. These may be of the conventional type employing pneumatic tires. The wheels are arranged on a common axis and are rotatably secured to stub axles 12 and 13 which extend outwardly from a pair of V-shaped members 14 and 15, which, as will presently be described, form the end structural members for the frame.

Figure 4:
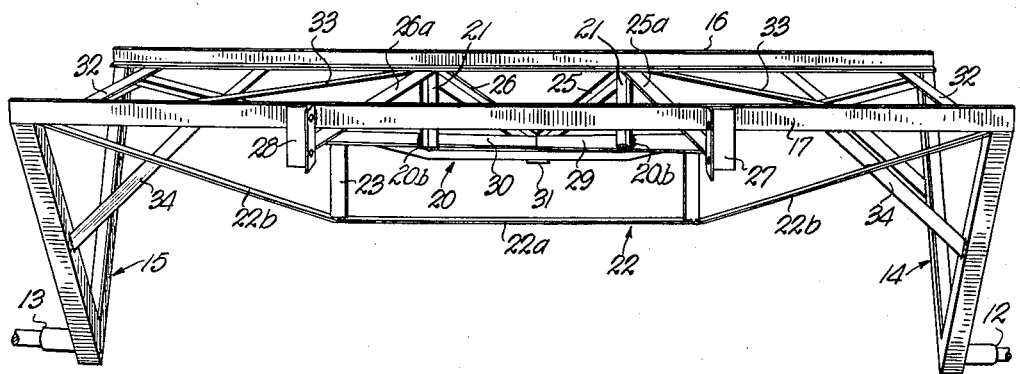
Fig. 4 is a rear perspective view of the trailer frame, the wheels having been omitted for purposes of illustration.
Figure 5:
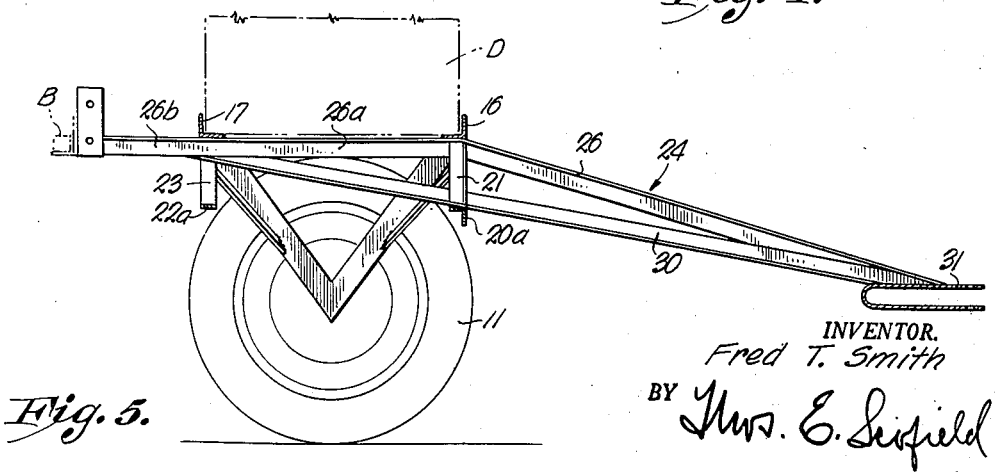
Fig. 5 is a sectional view taken along the line 5—5 of Fig. 1 in the direction of the arrows.

The V-shaped end members 14 and 15 are identical in construction, each preferably formed of conventional angle irons (L-shaped in cross section) with the apex of the V adjacent the center of its associated wheel and the legs extending upwardly. The axles 12 and 13 are rigidly secured at the apices of the end members, preferably by welding, and extend outwardly to receive the wheels 10 and 11. As will be noted from Figs. 2 and 4, the angle irons are so disposed that one flange extends toward the wheels so that at the apex of the V the associated axle is supported between and by the converging outwardly directed flanges.

Extending between and connecting the end members 14 and 15 with one another are a pair of horizontal top frame members 16 and 17. These frame members preferably comprise straight pieces of angle iron which are secured at their respective ends to the corresponding upper ends of the legs of the end members 14 and 15. The frame members are so disposed on the frame that the horizontal flanges of the angle irons of which they are composed will underlie diametrically opposed marginal portions of the bottoms of drums D (see Fig. 5) and the vertical flanges extend upwardly to engage a limited portion of the side walls of the drums. For convenience in description the frame member 16 will be designated as the forward top frame member and member 17 will be designated as the rear top frame member.

The drums D can be removably secured in position on top frame members 16 and 17 by means of upright tie down rods 18 having hook portions 18a which engage the top flange or rim of the drum. The lower ends of tie down rods 18 extend through apertures 16a and 17a spaced at intervals along the top frame members and are threaded to receive nuts 19 which abut the under sides of the top frame members. By turning on nuts 19 the tie down rods are drawn downward to firmly clamp the drum in place on the frame.

Disposed beneath the top frame member 16 and having a central horizontal section 20a and upwardly inclined end portions 20b, is a front tension member 20. Preferably this also is formed of angle iron bent to the shape shown and described. The ends of tension member 20 are firmly secured (for example by welding) to the forward legs of the respective end members 14 and 15 and the central section 20a is spaced vertically below the front frame member. A pair of upright compression members 21 are supported at their lower ends on the tension member adjacent the ends of the central section 20a being welded thereto and extend upwardly to underlie and provide intermediate supports for the front frame member.

The rear top frame member 17 is provided with a similar tension member 22 having a relatively horizontal center section 22a and upwardly inclined end sections 22b, The opposite ends of the rear tension member 22 are secured to the rear legs of end members 14 and 15 by any suitable means, for example, welding. The central section 22a of the rear tension member is spaced vertically below the central section of the rear frame member 17 and a pair of upright compression members 23 extend therebetween. The rear tension member is illustrated as being of bar stock bent to provide the desired shape. The lower ends of compression members 23 are secured to the rear tension member at the respective ends of the central section 22a thereof, preferably by welding, and the upper ends support the central section of the top frame member, although as later to be described, they are not in direct contact therewith.

The tongue of the trailer is indicated generally at 24. As will be noted from Figs. 1 and 3, the tongue comprises an assembly of component structural members which are preferably arranged symmetrically with respect to a vertical plane passing centrally and normal to the axis of wheels 10 and 11. At 25 and 26 are indicated a pair of upper tongue members joined at their outer ends to provide a generally V-shaped arrangement. These members may also conveniently be angle iron. At their inner ends, the tongue members 25 and 26 are provided with horizontally disposed portions 25a and 26a which underlie and are secured to the horizontal flanges of the respective front and rear top frame members 16 and 17. As will be observed from Figs. 1, 2 and 5, the portions 25a and 26a extend beyond the trailer frame on the opposite side from the tongue, the extending portions being designated as 25b and 26b. Secured to the outer ends of these extensions are short lengths of angle iron 27 and 28 which, in combination with the extension, provide cantilevered mounting brackets for the spray boom B.

Also forming a part of the tongue assembly are a pair of lower tongue members 29 and 30 which, like the upper tongue members, are conveniently formed of angle iron and are arranged in the shape of a V. The outer ends of the lower tongue members are joined to each other and to the outer ends of the upper tongue members 25 and 26. Preferably the joined ends of the upper and lower tongue members are bevelled to a common plane, providing means for securing thereto (for instance by welding) a U-shaped hitch 31 for connecting the tongue with the draw bar of a tractor or light vehicle (not shown). As will be noted from Fig. 2, the lower tongue members extend in a substantially straight line from hitch 31 to the rear top frame member 17. They are thus spaced below the upper tongue members 25 and 26 as they pass beneath the front top member 16. The arrangement is such that the lower tongue members are sandwiched at these points between the lower ends of compression members 21 and the upper base of the front tension member 20, suitable welds 20b being provided to connect them all together. The rearward ends of the lower tongue members merge with and are welded to the horizontally disposed portions 25a and 26a of the upper tongue members immediately below the top frame member 17. The upper ends of rear compression members 23 abut the undersides of the upper tongue members 25 and 26, being welded thereto and thus are capable of supporting the rear top frame member through the intermediary portions of the upper and lower tongue members.

To strengthen the over-all frame assembly, additional tie members and braces are provided. For example, the front and rear top frame members 16 and 17 are connected near their ends by cross ties 32 (likewise conveniently formed of angle iron), welded at their ends to the under sides of the respective frame members. Additional diagonal ties 33 are provided, these extending from points on the front frame member 16 adjacent the intersection therewith of the upper tongue members to the extreme ends of the rear top frame member 17. The respective legs of the V-shaped end members 14 and 15 may be tied to their associated top frame members 16 and 17 by diagonal braces 34 which are secured at their ends to the leg and frame members and intermediately to the intersecting portions 20b and 22b of the tension members 20 and 22.

The operation of the invention is believed fairly evident from the foregoing description. In use, the trailer is attached by hitch 31 to a suitable draft vehicle, such as a tractor. The trailer is thus supported in level attitude by a three point support which includes the running wheels 10 and 11 and the connection of hitch 31 with the tractor. Through a conventional pumping system, which plays no part in the invention and hence is not shown, spray liquid is forced under pressure from drums D to the spray boom B. The weight of the drums is absorbed in column stresses in the compression members 21 and 23 and tension stresses in tension members 20 and 22, rather than in beam stresses in the top frame members 16 and 17, thus making it possible to construct the top frame members of light weight material having a relatively low cross-sectional moment of inertia. By centering the frame assembly with respect to wheels 10 and 11, the weight of drums 10 is centered substantially over the axis of wheels 10 and 11 which eliminates any substantial bending moment in the tongue structure. Moreover, the tongue structure is so formed and tied to the frame as to distribute any stresses developing therein to a plurality of locations in the frame, thus avoiding undesirable points of high stress concentration.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

In a two wheel tractor-drawn trailer for carrying crop spraying equipment of the type employing spray booms and in which the spray liquid is contained in conventional drums, the combination of a pair of spaced coaxial wheels for traveling over the ground, a pair of vertically disposed parallel V-shaped end members, one for each wheel, said end members being disposed closely adjacent their respective wheels on the inboard side thereof, and having their apices adjacent the wheel axis with the legs of the V extending upwardly, means rotatably securing the apices of said end members to the wheel centers, a pair of parallel top frame members extending between said end members, the respective ends of said top members being secured to and supported by the upper ends of the legs of said end members, said top frame members being spaced apart a distance such that they are adapted to receive thereon diametrically opposed portions of the bottom of a spray drum, a pair of tension members, one for each top frame member, each of said tension members being disposed below its respective top frame member, the ends of the tension members being secured to the ends of the top frame members, each tension member having a central portion spaced below the central portion of its frame member, the portions of said tension member on opposite sides of the central portion thereof being inclined upwardly toward their ends, at least one compression member disposed between the central portion of each top frame member and its underlying tension member to transmit any beam load on the frame member to the tension member, and a tongue member rigidly connected with said frame members intermediate the wheels and extending outwardly transverse to said frame members to provide means for connecting said trailer to a tractor, said tongue member comprising a pair of upper tongue members spaced apart at one end and secured to the nearest one of the top frame members, and converging outwardly to form a substantial V, a trailer hitch secured to the apex of the V, and a pair of lower tongue members also converging at one end in the shape of a V and joined at said hitch, the lower tongue members having their other ends secured to the other of said top frame members, said lower tongue members passing through the space between said nearest one of said top frame members and its tension member and being supported intermediate their ends on said tension member.

References Cited in the file of this patent

UNITED STATES PATENTS

| | | |
|---|---|---|
| 690,207 | Vanderbilt | Dec. 31, 1901 |
| 1,200,954 | Lawlor | Oct. 10, 1916 |
| 1,587,366 | Borchert | June 1, 1926 |
| 2,620,201 | Brady | Dec. 2, 1952 |

FOREIGN PATENTS

| | | |
|---|---|---|
| 131,557 | Great Britain | Aug. 28, 1919 |